G. MATHESON.
UNION AND JOINT FOR TUBING.
No. 191,768.  Patented June 12, 1877.
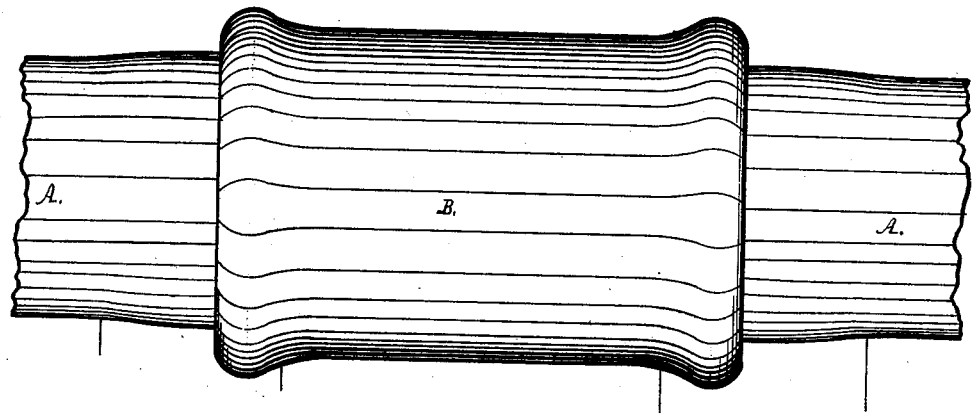
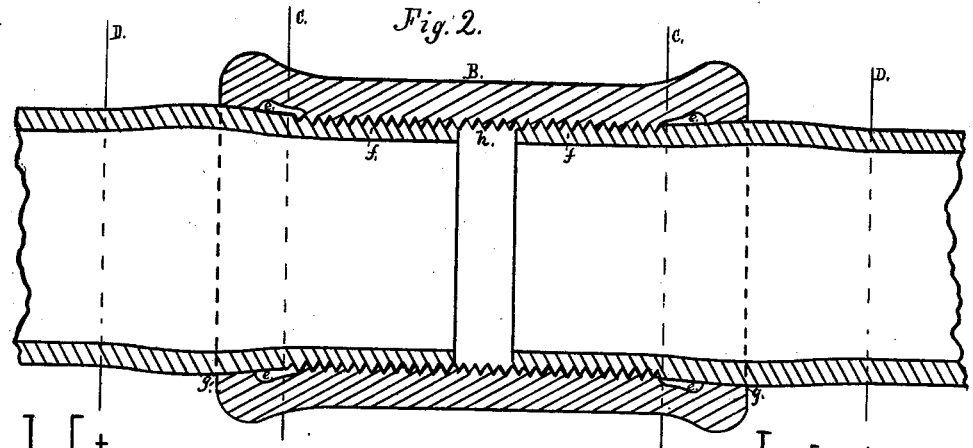

UNITED STATES PATENT OFFICE.

GEORGE MATHESON, OF McKEESPORT, PENNSYLVANIA.

IMPROVEMENT IN UNION AND JOINT FOR TUBING.

Specification forming part of Letters Patent No. 191,768, dated June 12, 1877; application filed May 4, 1877.

*To all whom it may concern:*

Be it known that I, GEORGE MATHESON, of McKeesport, in the county of Allegheny and State of Pennsylvania, have invented a new and useful Improvement in Union and Joints for Tubing; and I do hereby declare that the following is a full and exact description thereof, reference being had to the accompanying drawing, and to the letters of reference marked thereon.

My invention relates to an improvement in union and joints for tubing; and consists in contracting the socket having recesses, and also in giving it enlarged or bell-mouth openings at the ends, and increasing the diameter of the tubing at a point beyond the screw-threads thereof, so that the enlarged portion of the socket beyond its screw-threads will impinge upon the enlargement of the tube, thereby causing the socket to brace and stiffen the tubing and joint in the formation of the latter.

To enable others skilled in the art to make and use my invention, I will proceed to describe its construction and operation.

In the accompanying drawing, which forms part of my specification, Figure 1 represents my improvement in union and joints for tubing for deep wells. Fig. 2 is a longitudinal section of the same.

In the drawings, A represents the tubing, the outer diameter of which is enlarged at or about that portion between the lines D C, which enlargement may be accomplished by an expansion of the tubing, or by such other means as the mechanic may think best. In the formation of a union and joint the part of the ends of the tubing marked *f* are furnished with screw-threads in the usual manner. The socket or union is enlarged at its mouths, as indicated at *g*, making it slightly bell-mouth. The socket is also furnished with recesses, as indicated at *e*, and furnished with screw-threads, as indicated at *h*. The enlargement of the mouths of the socket should in all cases correspond to the enlarged diameter of the tubing, and the screw-threads of the socket correspond to the screw-threads of the tubing. By enlarging the diameter of the tubing, as hereinbefore described, and increasing the mouths of the socket to correspond therewith, and furnishing it with the recesses *e* in the formation of a union and a joint of tubing, the portion of the socket beyond its screw-threads will impinge upon the enlargement of the tubing at a point beyond its screw-threads, thereby bracing and stiffening the tubing and joint in the formation of a union of two or more sections of tubing, so that the jarring and straining action common to the tubing and the joints thereof in the process of pumping and manipulating them is resisted, and a close, strong, and efficient joint is secured.

Having thus described the nature, construction, and operation of my improvement, what I claim as of my invention, and desire to secure by Letters Patent of the United States, is—

1. In a union or joint for tubing for deep wells, the socket or union made to impinge upon an inclined bearing beyond the screw-threads of the socket and tubing, substantially as herein described, and for the purpose set forth.

2. The socket B, provided with a recess, *e*, and bell-mouth *g*, substantially as herein described, and for the purpose set forth.

3. In a union or joint for tubing, the enlargement of the tube in its outer diameter at or about the part between the lines D C, in combination with the bell-mouth socket B, having recess *e* between said bell-mouth and screw-threads, substantially as herein described, and for the purpose set forth.

GEO. MATHESON.

Witnesses:
A. C. JOHNSTON,
JAMES J. JOHNSTON.